US010761645B2

(12) United States Patent
Edwards

(10) Patent No.: US 10,761,645 B2
(45) Date of Patent: *Sep. 1, 2020

(54) SENSING DEVICES

(71) Applicant: InnoLux Corporation, Miao-Li County (TW)

(72) Inventor: Martin John Edwards, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/199,494

(22) Filed: Nov. 26, 2018

(65) Prior Publication Data

US 2019/0095039 A1   Mar. 28, 2019

Related U.S. Application Data

(63) Continuation of application No. 14/601,429, filed on Jan. 21, 2015, now Pat. No. 10,168,818, which is a continuation of application No. 12/953,898, filed on Nov. 24, 2010, now Pat. No. 8,970,541.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04111* (2013.01)

(58) Field of Classification Search
CPC ............................. G06F 3/0416; G06F 3/044
USPC ......................................................... 345/174
See application file for complete search history.

(56) References Cited

U.S. PATENT DOCUMENTS

| 7,986,152 B2 | 7/2011 | Philipp et al. |
| 8,217,902 B2 | 7/2012 | Chang et al. |
| 8,345,021 B2 | 1/2013 | Jung et al. |
| 8,552,995 B2 | 10/2013 | Philipp et al. |

(Continued)

FOREIGN PATENT DOCUMENTS

| CN | 101681223 | 3/2010 |
| CN | 101782821 | 7/2010 |

(Continued)

OTHER PUBLICATIONS

Taiwanese language office action dated Apr. 8, 2014.

*Primary Examiner* — Fred Tzeng
(74) *Attorney, Agent, or Firm* — McClure, Qualey & Rodack, LLP

(57) ABSTRACT

A sensing device is provided. The sensing device includes at least one first receiving electrode, a plurality of first electrodes, and at least one second electrode. The first receiving electrode extends in a first direction. The first electrodes are connected electrically by a first signal line. The width of each first electrode is larger than a width of the first signal line. The first signal line passes through the first electrodes. The first signal line and the first electrodes are overlapped. The first electrodes have a first voltage level. The second electrode has a second voltage level. The first electrodes and the second electrode are disposed on the same row which extends in a second direction intersecting the first direction. The first voltage level is different from the second voltage level. The first signal line crosses the first receiving electrode and the second electrode.

16 Claims, 7 Drawing Sheets

(56) References Cited

U.S. PATENT DOCUMENTS

| | | |
|---|---|---|
| 2006/0181516 A1 | 8/2006 | Staines |
| 2007/0074914 A1 | 4/2007 | Geaghan et al. |
| 2008/0278178 A1 | 11/2008 | Philipp |
| 2009/0085891 A1 | 4/2009 | Yang et al. |
| 2009/0160824 A1 | 6/2009 | Ting |
| 2009/0231298 A1 | 9/2009 | Yang |
| 2009/0273572 A1 | 11/2009 | Edwards et al. |
| 2010/0053097 A1 | 3/2010 | Goh et al. |
| 2010/0182259 A1 | 7/2010 | Jung et al. |
| 2010/0214247 A1 | 8/2010 | Tang et al. |
| 2010/0252335 A1 | 10/2010 | Orsley |
| 2010/0328228 A1 | 12/2010 | Elias |
| 2011/0134052 A1 | 6/2011 | Tsai et al. |
| 2011/0141037 A1 | 6/2011 | Hwang et al. |
| 2011/0148435 A1 | 6/2011 | Schwartz |
| 2011/0193793 A1 | 8/2011 | An et al. |
| 2011/0193796 A1 | 8/2011 | Cho et al. |
| 2011/0227838 A1 | 9/2011 | Jeon et al. |
| 2011/0234510 A1 | 9/2011 | Jeong et al. |
| 2012/0019450 A1 | 1/2012 | Huang et al. |
| 2015/0138150 A1* | 5/2015 | Edwards ................. G06F 3/044 345/174 |

FOREIGN PATENT DOCUMENTS

| | | |
|---|---|---|
| TW | 200915160 | 4/2009 |
| TW | 201022685 | 6/2010 |

\* cited by examiner

SENSING DEVICES

CROSS REFERENCE TO RELATED APPLICATIONS

This application is a Continuation of pending U.S. patent application Ser. No. 14/601,429, filed Jan. 21, 2015 and entitled "SENSING DEVICES", which is a Continuation of U.S. patent application Ser. No. 12/953,898, filed Nov. 24, 2010 and entitled "SENSING DEVICES" (now U.S. Pat. No. 8,970,541, issued Mar. 3, 2015).

BACKGROUND OF THE INVENTION

Field of the Invention

The invention relates to a sensing device, and more particularly to a capacitive touch sensing device.

Description of the Related Art

A conventional capacitive touch sensing device comprises a sensing array which consists of horizontal sensing electrodes and vertical sensing electrodes. During the operation of the sensing device, the coupling of noise onto the sensing electrodes from the surrounding environment may cause errors. For example, when the sensing device is integrated with a display device, noise may be coupled onto the sensing electrodes from display electrodes of the display device. FIG. 1 shows capacitance, which is present on the sensing electrodes when the sensing electrodes are integrated on the color filter substrate of the display device. In FIG. 1, only one horizontal sensing electrode T10 and one vertical sensing electrode R10 are shown. A capacitance Cpar is formed between the horizontal sensing electrode T10 and a voltage terminal Vcom, and another capacitance is formed between the vertical sensing electrode R10 and the voltage terminal Vcom. When a grounded object 10 approaches the crossing point of the horizontal sensing electrode T10 and the vertical sensing electrode R10, the crossing capacitance Ccross between the horizontal sensing electrode T10 and the vertical sensing electrode R10 is decreased. The variation of the value of the crossing capacitance Ccross can be measured by applying a transmitting signal to the horizontal sensing electrode T10 from a transmitter 11 and by detecting the coupled signal on the vertical sensing electrode R10 using a receiver 12.

FIG. 2 shows a conventional pattern of horizontal sensing electrodes and vertical sensing electrodes in a capacitive touch sensing device. Between crossing points of horizontal sensing electrodes T1~T3 and vertical sensing electrodes R1~R3, these sensing electrodes are widened to firm diamond shapes. Referring to FIG. 2, all of the diamond shapes of one horizontal sensing electrode receive the same transmitting signal from a transmitter. In other words, the diamond shapes on the same horizontal row are belonged to the same horizontal sensing electrode and are not controlled independently by a transmitter, which reduces types of cross-capacitance measurement methods.

BRIEF SUMMARY OF THE INVENTION

One exemplary embodiment of a sensing device is provided. The sensing device comprises at least one first receiving electrode, a plurality of first electrodes, and at least one second electrode. The at least one first receiving electrode extends in a first direction. The plurality of first electrodes are connected electrically by a first signal line. The width of each first electrode is larger than a width of the first signal line. The first signal line passes through the plurality of first electrodes. The first signal line and the plurality of first electrodes are overlapped. The plurality of first electrodes have a first voltage level. The at least one second electrode has a second voltage level. The plurality of first electrodes and the at least one second electrode are disposed on the same row which extends in a second direction intersecting the first direction. The first voltage level is different from the second voltage level. The first signal line crosses the at least one first receiving electrode and the at least one second electrode.

Another exemplary embodiment of a sensing device is provided. The sensing device comprises a plurality of first receiving electrodes, a plurality of first electrodes, and a plurality of second electrodes. The plurality of first receive electrode extending in a first direction. The plurality of first electrodes extend in a second direction intersecting the first direction. The plurality of first electrodes have a first voltage level and are electrically connected by a first signal line. The first signal line passes through the plurality of first electrodes. The first signal line and the plurality of first electrodes are overlapped. The width of each first electrode is larger than a width of the first signal line. The plurality of second electrodes extend in the second direction. The plurality of second electrodes have a second voltage level. The first voltage level is different from the second voltage level. One of the plurality of first electrodes and one of the first receiving electrode are respectively closest to one of the plurality of second electrodes, and the one of the plurality of second electrodes is disposed between the one of the plurality of first electrodes and the one of the first receiving electrode in the second direction. The first signal line crosses the plurality of first receiving electrode and the plurality of second electrode.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
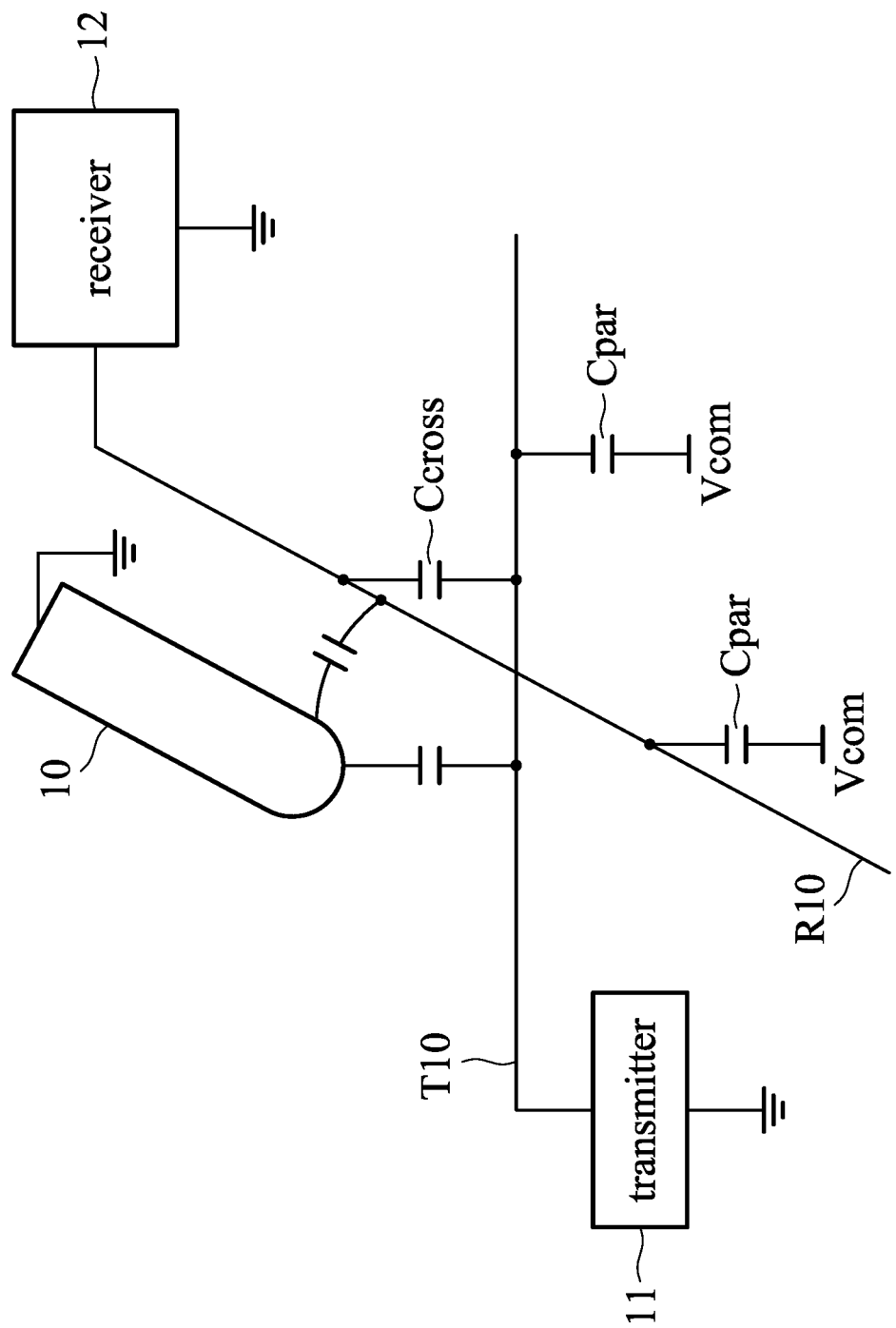
FIG. 1 shows capacitance, which is present on the sensing electrodes when the sensing electrodes are integrated on the color filter substrate of the display device.
Figure 2:
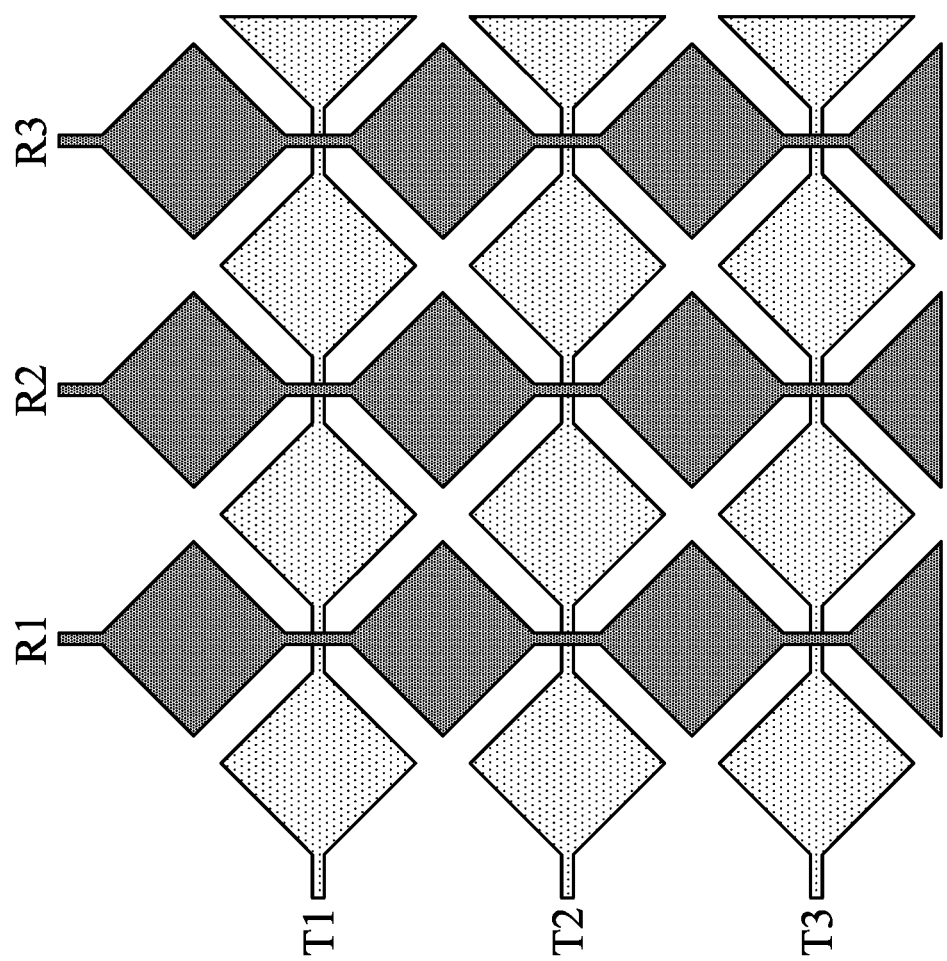
FIG. 2 shows a conventional pattern of horizontal sensing electrodes and vertical sensing electrodes in a capacitive touch sensing device.
Figure 3:
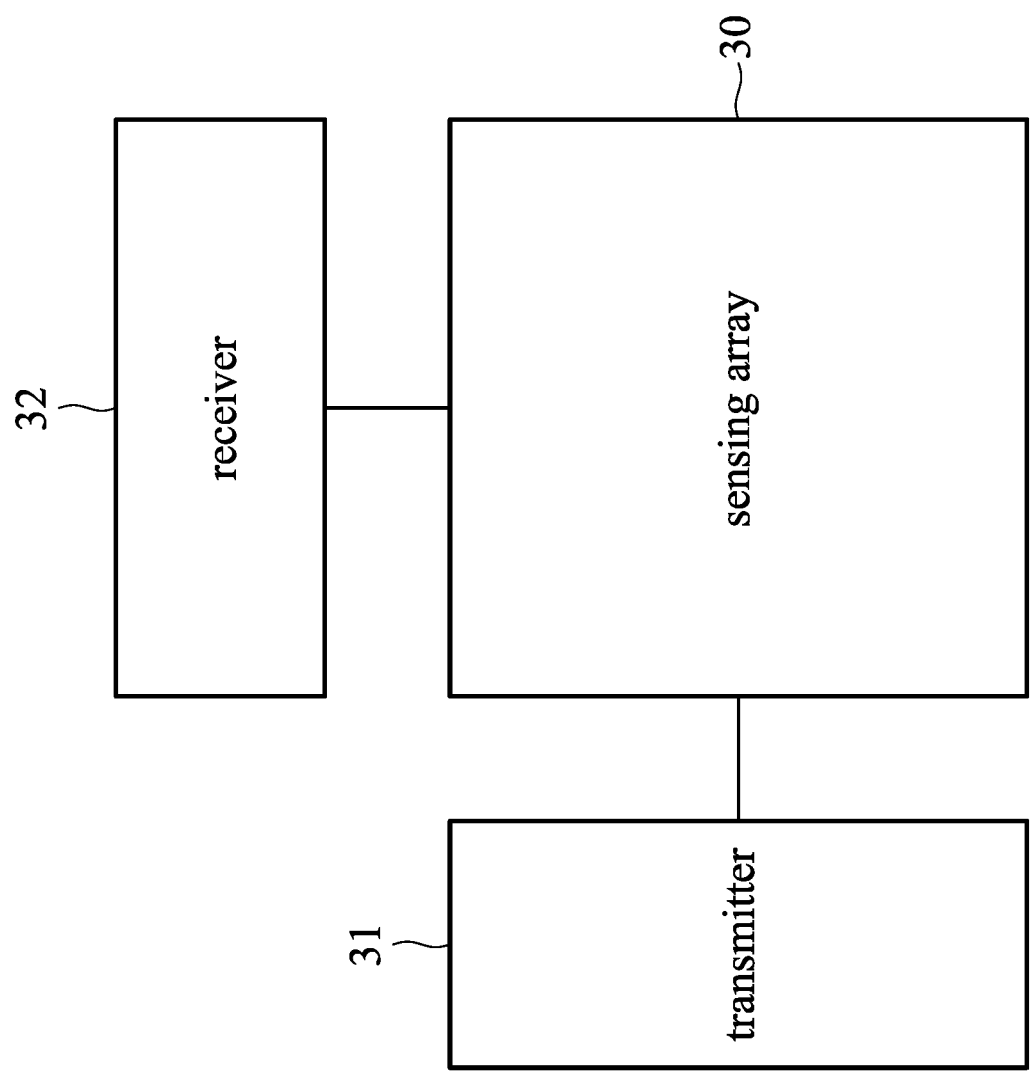
FIG. 3 shows an exemplary embodiment of a sensing device.
Figure 4:
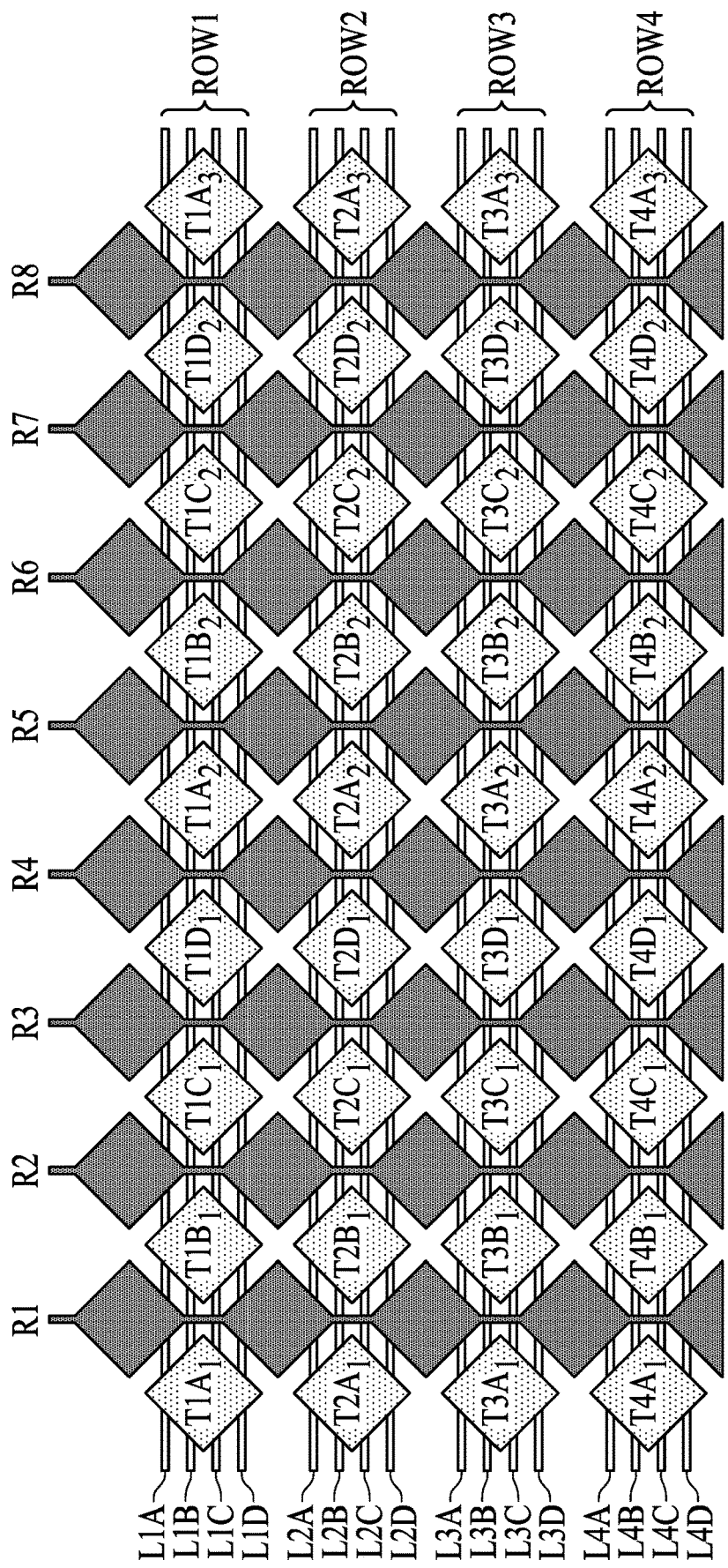
FIG. 4 shows an exemplary embodiment of a sensing array.

Sensing devices are provided. In an exemplary embodiment of a sensing device in FIG. 3, a sensing device 3 generates a sensing signal according to a touch of an object and comprises a sensing array 30, at least one transmitter 31, and at least one receiver 32. In the embodiment, the sensing device 3 is a capacitive touch sensing device. FIG. 4 shows an exemplary embodiment of the sensing array 30. Referring to FIG. 4, the sensing array 30 comprises a plurality of transmitting electrodes and a plurality of receiving electrodes. In the embodiment, eight receiving electrodes R1~R8 are given as an example. The receiver 32 are coupled to the receiving electrodes R1~R8. The receiving electrodes R1~R8 extend in a first direction, for example the vertical direction. The receiving electrodes R1~R8 are arranged in turn from the left side to the right side, as shown in FIG. 4. The transmitting electrodes are controlled by the transmitter 31. The transmitting electrodes are disposed on rows. The rows extend in a second direction intersecting the first direction, for example the horizontal direction, and the rows are arranged in turn from the upper side to the lower side, as shown in FIG. 4.

In FIG. 4, four rows ROW1~ROW4 are given as an example. For each row, transmitting electrodes are divided into four groups A~D. Referring to FIG. 4, in the row ROW1, there are transmitting electrodes $T1A_1$ and $T1A_2$ (group A), $T1B_1$ and $T1B_2$ (group B), $T1C_1$ and $T1C_2$ (group C), and $T1D_1$ and $T1D_2$ (group D). In the row ROW2, there are transmitting electrodes $T2A_1$ and $T2A_2$, $T2B_1$ and $T2B_2$, $T2C_1$ and $T2C_2$, and $T2D_1$ and $T2D_2$. In the row ROW3, there are transmitting electrodes $T3A_1$ and $T3A_2$, $T3B_1$ and $T3B_2$, $T3C_1$ and $T3C_2$, and $T3D_1$ and $T3D_2$. In the row ROW4, there are transmitting electrodes $T4A_1$ and $T4A_2$, $T4B_1$ and $T4B_2$, $T4C_1$ and $T4C_2$, and $T4D_1$ and $T4D_2$. In each row, one set of four transmitting electrodes respectively belonging to the groups A~D are congregated. In FIG. 4, two sets are given as an example for each row. For example, in the row ROW1, the transmitting electrodes $T1A_1$, $T1B_1$, $T1C_1$, and $T1D_1$ form one set, and the transmitting electrodes $T1A_2$, $T1B_2$, $T1C_2$, and $T1D_2$ form the other set. In the embodiment, there are four transmitting electrodes in one set. However, in other embodiments, based on the pattern of the transmitting electrodes in FIG. 5, the number of transmitting electrode sets on one row and the number of transmitting electrodes in one set can be determined according to system requirement, without limitation.

Moreover, in each row, the transmitting electrodes belonging to the same group are coupled to the same signal line for receiving the same signal. For example, in the row ROW1, the transmitting electrodes $T1A_1$ and $T1A_2$ belonging to the group A are coupled to a signal line L1A, the transmitting electrodes $T1B_1$ and $T1B_2$ belonging to the group B are coupled to a signal line L1B, the transmitting electrodes $T1C_1$ and $T1C_2$ belonging to the group C are coupled to a signal line L1C, and the transmitting electrodes $T1D_1$ and $T1D_2$ belonging to the group D are coupled to a signal line L1D. In the rows ROW2~ROW4, the signal lines L2A~L2D, L3A~L3D, and L4A~L4D are coupled to the corresponding transmitting electrodes according to the previous like descriptions. Thus, related descriptions are omitted here. The signal lines L1A~L1D, L2A~L2D, L3A~L3D, and L4A~L4D are coupled to the transmitter 31.

Referring to FIG. 4, near the crossing point between the receiving electrodes R1~R8 and the rows ROW1~ROW4, the receiving electrodes R1~R8 are widened to form diamond shapes and are in illustrated by dense dots, and the transmitting electrodes in the rows ROW1~ROW4 are also widened to form diamond shapes and are in illustrated by sparse dots.

In the following, the transmitting electrodes in the row ROW1 and the receiving electrodes R1~R8 are given as an example for description. For the first set of transmitting electrodes in the row ROW1, the transmitting electrodes $T1A_1$ and $T1B_1$ are respectively disposed on the two sides of the receiving electrode R1, the transmitting electrodes $T1B_1$ and $T1C_1$ are respectively disposed on the two sides of the receiving electrode R2, and transmitting electrodes $T1C_1$ and $T1D_1$ are respectively disposed on the two sides of the receiving electrode R3. For the second set of the transmitting electrodes in the row ROW1, the transmitting electrodes $T1A_2$ and $T1B_2$ are respectively disposed on the two sides of the receiving electrode R5, the transmitting electrodes $T1B_2$ and $T1C_2$ are respectively disposed on the two sides of the receiving electrode R6, and the transmitting electrodes $T1C_2$ and $T1D_2$ are respectively disposed on the two sides of the receiving electrode R7. Note that the transmitting electrode $T1D_1$ of the first set and the transmitting electrode $T1A_2$ of the second set are respectively disposed on the two sides of the receiving electrode R4. The transmitting electrode $T1D_2$ is also disposed on one side of the receiving electrode R8, and another transmitting electrode $T1A_3$ which is coupled to the signal line L1A is disposed on the other side of the receiving electrode R8.

For the row ROW1, in one transmitting electrode set, the transmitting electrodes respectively belonging to the groups A–D are independently controlled by the transmitter 31 respectively through the signal lines L1A~L1D. For example, when the receiver 32 measures a crossing capacitance between two adjacent transmitting electrodes on one row and a specific receiving electrode, the transmitter 31 provides a transmitting signal to the two adjacent transmitting electrodes. The receiver 32 generates the sensing signal according to the signal level of the specific receiving electrodes which is induced by the transmitting signal through the crossing capacitance. Moreover, the transmitter 31 provides a predetermined voltage level to the other transmitting electrodes on the row ROW1 which do not receive the transmitting signal from the transmitter 31. In the embodiment, the predetermined voltage level can be a voltage level of a ground. In another embodiment in which a differential measurement is used, when the receiver 32 measures a crossing capacitance between two adjacent transmitting electrodes on one row and a specific receiving electrode which is coupled one input terminal of the receiver 32, the transmitter 31 provides a transmitting signal to the two adjacent transmitting electrodes. Moreover, the transmitter 31 provides a voltage level with the polarity inverse to the polarity of the voltage level of the transmitting signal to the transmitting electrodes adjacent to the receiving electrode which is coupled to the other terminal of the receiver 32. If there are remaining transmitting electrodes which do not receive the transmitting signal and the voltage level with the inverse polarity, the transmitter 31 further provides a ground voltage level to these remaining transmitting electrodes.

Assume that a crossing capacitance between two adjacent transmitting electrodes $T1A_1$ and $T1B_1$ and the receiving electrode R1 is measured. The transmitter 31 provides the transmitting signal to the adjacent transmitting electrodes $T1A_1$ and $T1B_1$, respectively, through the signal lines L1A and L1B. The transmitter 31 provides the predetermined voltage level to the other transmitting electrodes $T1C_1$, T1D$_1$, T1C$_2$, and T1D$_2$ which do not receive the transmitting signal from the transmitter 31.

Further assume that a crossing capacitance between two adjacent transmitting electrodes T1C$_1$ and T1D$_1$ and the receiving electrode R3 is measured. The transmitter 31 provides a transmitting signal to the adjacent transmitting electrodes T1C$_1$ and T1D$_1$ respectively through the signal lines L1C and L1D. The transmitter 31 provides the predetermined voltage level to the other transmitting electrodes T1A$_1$, T1B$_1$, T1A$_2$, and T1B$_2$ which do not receive signals from the transmitter 31.

Assume the sensing array in FIG. 4 is applied in a differential measurement, the receiver 32 is implemented by is a differential receiver circuit with two input terminals. When a crossing capacitance between two adjacent transmitting electrodes T1A$_1$ and T1B$_1$ and the receiving electrode R1 is measured. The transmitter 31 provides the transmitting signal to the adjacent transmitting electrodes T1A$_1$ and T1B$_1$, respectively, through the signal lines L1A and L1B. One input terminal of the receiver 32 is coupled to the receiving electrode R1, and the other input terminal thereof is coupled to the receiving electrode R3 separated from the transmitting electrodes T1A$_1$ and T1B$_1$, as shown in Table 1. Moreover, the other transmitting electrodes T1C$_1$, T1D$_1$, T1C$_2$, and T1D$_2$ which do not receive signals from the transmitter 31 are connected to the fixed voltage level, such as a voltage level of a ground. When a crossing capacitance between two adjacent transmitting electrodes T1C$_1$ and T1D$_1$ and the receiving electrode R3 is measured. The transmitter 31 provides a transmitting signal to the adjacent transmitting electrodes T1C$_1$ and T1D$_1$ respectively through the signal lines L1C and L1D. One input terminal of the receiver 32 is coupled to the receiving electrode R3, and the other terminal thereof is coupled to the receiving electrode R5 or R1 separated from the transmitting electrodes T1C$_1$ and T1D$_1$, as shown in Table 1. Moreover, the other transmitting electrodes T1A$_1$, T1B$_1$, T1A$_2$, and T1B$_2$ which do not receive signals from the transmitter 31 are connected to the fixed voltage level. According to the differential capacitance measurement, when the sensing device 3 with the sensing array of FIG. 4 is integrated with a display device, the noise on the measured receiving electrode resulted from display electrodes of the display device or from other sources can be eliminated.

TABLE 1

| Measuring crossing capacitance between the two adjacent transmitting electrodes and the receiving electrode | Providing a transmitting signal to the transmitting electrodes | Connecting the receiving electrode to one input terminal of the receiver | Connecting the receiving electrode to the other input terminal of the receiver |
|---|---|---|---|
| T1A$_1$ & T1B$_1$, R1 | T1A$_1$ & T1B$_1$ | R1 | R3 |
| T1B$_1$ & T1C$_1$, R2 | T1B$_1$ & T1C$_1$ | R2 | R4 |
| T1C$_1$ & T1D$_1$, R3 | T1C$_1$ & T1D$_1$ | R3 | R1 or R5 |
| T1D$_1$ & T1A$_2$, R4 | T1D$_1$ & T1A$_2$ | R4 | R2 or R6 |
| T1A$_2$ & T1B$_2$, R5 | T1A$_2$ & T1B$_2$ | R5 | R3 or R7 |
| T1B$_2$ & T1C$_2$, R6 | T1B$_2$ & T1C$_2$ | R6 | R4 or R8 |
| T1C$_2$ & T1D$_2$, R7 | T1C$_2$ & T1D$_2$ | R7 | R5 |
| T1D$_2$ & T1A$_3$, R8 | T1D$_2$ & T1A$_3$ | R8 | R6 |

Figure 5:
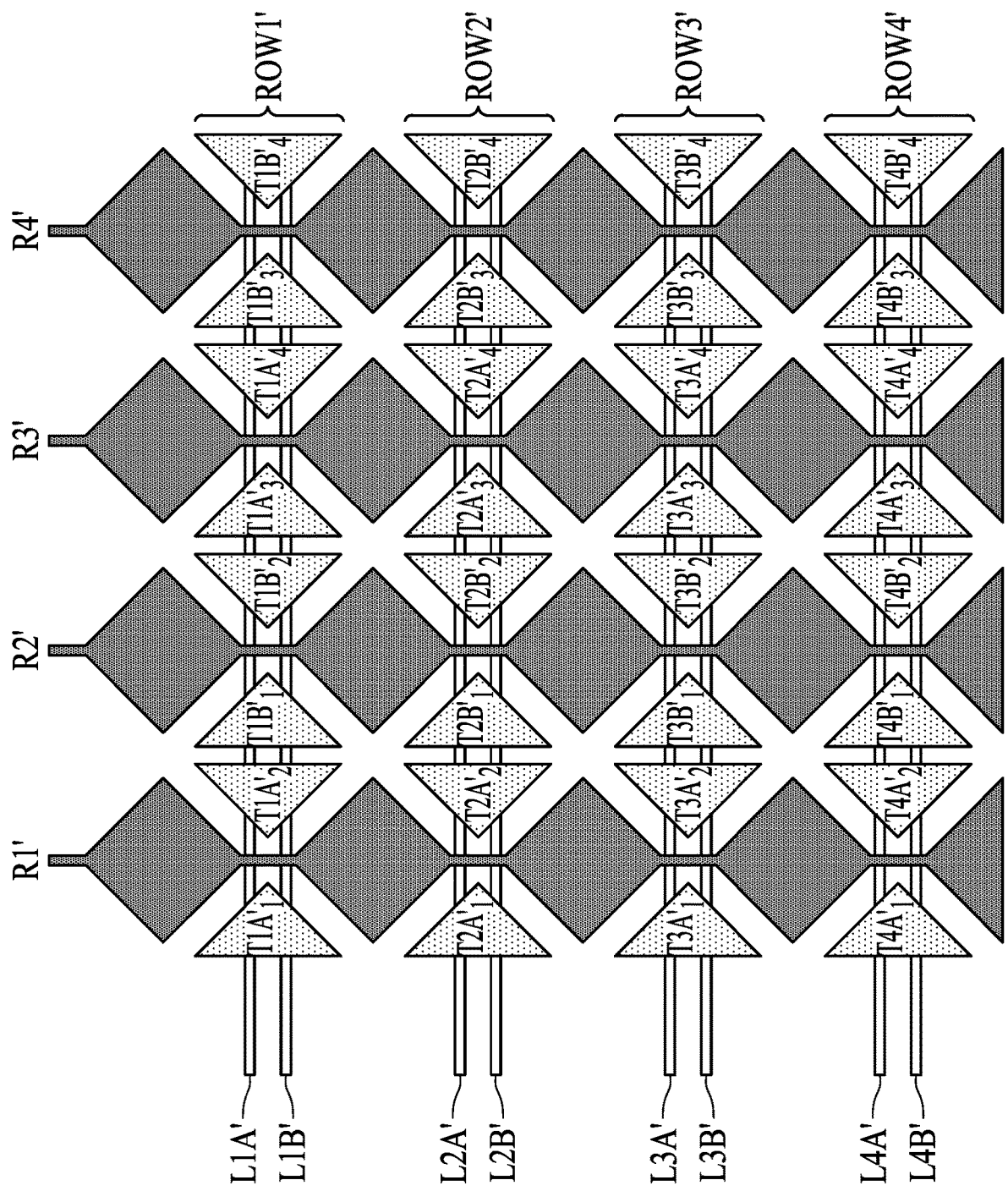
FIG. 5 shows an exemplary embodiment of a sensing array.

FIG. 5 shows another exemplary embodiment of the sensing array 30. Referring to FIG. 5, the sensing array 30 comprises a plurality of transmitting electrodes and a plurality of receiving electrodes. In the embodiment, four receiving electrodes R1'~R4' are given as an example. The receiver 32 are coupled to the receiving electrodes R1'~R4'. The receiving electrodes R1'~R4' extends in a first direction, for example the vertical direction. The receiving electrodes R1'~R4' are arranged in turn from the left side to the right side, as shown in FIG. 5. The transmitting electrodes are controlled by the transmitter 31. The transmitting electrodes are disposed on rows. The rows extend in a second direction intersecting the first direction, for example the horizontal direction, and the rows are arranged in turn from the upper side to the lower side, as shown in FIG. 5.

In FIG. 5, four rows ROW1'~ROW4' are given as an example. For each row, transmitting electrodes are divided into two groups A' and B'. Referring to FIG. 5, in the row ROW1', there are transmitting electrodes T1A'$_1$~T1A'$_4$ (group A) and T1B'$_1$~T1B'$_4$ (group B'). In the row ROW2', there are transmitting electrodes T2A'$_1$~T2'A$_4$ and T2B'$_1$~T2B'$_4$. In the row ROW3', there are transmitting electrodes T3A'$_1$~T3A'$_4$ and T3B'$_1$~T3B'$_4$. In the row ROW4', there are transmitting electrodes T4A'$_1$~T4A'$_4$ and T4B'$_1$~T4B'$_4$. In each row, one set of the four transmitting electrodes, two transmitting electrodes belonging to the group A and the other two transmitting electrodes belonging to the group B, are congregated. In FIG. 5, two sets are given as example for each row. For example, in the row ROW1', the transmitting electrodes T1A'$_1$~T1A'$_2$ and T1B'$_1$~T1B'$_2$ form one set, and the transmitting electrodes T1A'$_3$~T1A'$_4$ and T1B'$_3$~T1B'$_4$ form the other set. In the embodiment, there are four transmitting electrodes belonging to the two groups A and B in one set. However, in other embodiments, based on the pattern of the transmitting electrodes in FIG. 5, the number of transmitting electrodes in one set and the number of groups of the transmitting electrodes in one set can be determined according to system requirement, without limitation.

Moreover, in each row, the transmitting electrodes belonging to the same group are coupled to the same signal line for receiving the same signal. For example, in the row ROW1', the transmitting electrodes T1A'$_1$~T1A'$_4$ belonging to the group A are coupled to a signal line L1A', and the transmitting electrodes T1B'$_1$~T1B'$_4$ belonging to the group B are coupled to a signal line L1B'. In the rows ROW2'~ROW4', signal lines L2A'~L2B', L3A'~L3B', and L4A'~L4B' are coupled to the corresponding transmitting electrodes according to the previous like descriptions. Thus, related descriptions are omitted here. The signal lines L1A'~L1B', L2A'~L2B', L3A'~L3B', and L4A'~L4B' are coupled to the transmitter 31.

Referring to FIG. 5, near the crossing point between the receiving electrodes R1'~R4' and the rows ROW1'~ROW4', the receiving electrodes R1'~R4' are widened to form diamond shapes and are in illustrated by dense dots, and the transmitting electrodes in the rows ROW1'~ROW4' are also widened to form triangular shapes and are in illustrated by sparse dots.

In the following, the transmitting electrodes in the row ROW1' and the receiving electrodes R1'~R4' are given as an example for description. For the first set of transmitting electrodes in the row ROW1', the transmitting electrodes T1A'$_1$ and T1A'$_2$ are respectively disposed on the two sides of the receiving electrode R1', and the transmitting electrodes T1B'$_1$ and T1B'$_2$ are respectively disposed on the two sides of the receiving electrode R2'. For the second set of transmitting electrodes in the row ROW1', the transmitting electrodes T1A'$_3$ and T1A'$_4$ are respectively disposed on the two sides of the receiving electrode R3', and the transmitting electrodes T1B'$_3$ and T1B'$_4$ are respectively disposed on the two sides of the receiving electrode R4'.

For the row ROW1', in one transmitting electrode set, the transmitting electrodes respectively belonging to the groups A~B are independently controlled by the transmitter 31 respectively through the signal lines L1A'~L1B'. For example, when the receiver 32 measures a crossing capacitance between two adjacent transmitting electrodes on one row and a specific receiving electrode, the transmitter 31 provides transmitting signals to the two adjacent transmitting electrodes. The receiver 32 generates a sensing signal according to the signal level of the specific receiving electrodes which is induced by the transmitting signal through the crossing capacitance. Moreover, the transmitter 31 provides a predetermined voltage level to the other transmitting electrodes on the row ROW1' which do not receive the transmitting signal from the transmitter 31. In the embodiment, the predetermined voltage level can be a voltage level of a ground. In another embodiment in which a differential measurement is used, when the receiver 32 measures a crossing capacitance between two adjacent transmitting electrodes on one row and a specific receiving electrode which is coupled one input terminal of the receiver 32, the transmitter 31 provides a transmitting signal to the two adjacent transmitting electrodes. Moreover, the transmitter 31 provides a voltage level with the polarity inverse to the polarity of the voltage level of the transmitting signal to the transmitting electrodes adjacent to the receiving electrode which is coupled to the other terminal of the receiver 32. If there are remaining transmitting electrodes which do not receive the transmitting signal and the voltage level with the inverse polarity, the transmitter 31 further provides a ground voltage level to these remaining transmitting electrodes.

Assume that a crossing capacitance between two adjacent transmitting electrodes $T1A'_1$ and $T1A'_2$ and the receiving electrode R1' is measured. The transmitter 31 provides a transmitting signal to the adjacent transmitting electrodes $T1A'_1$ and $T1A'_2$ through the signal line L1A'. The transmitter 31 provides the predetermined voltage level to the other transmitting electrodes $T1B'_1$~$T1B'_4$ which do not receive the transmitting signal from the transmitter 31.

Further assume that a crossing capacitance between two adjacent transmitting electrodes $T1B'_1$ and $T1B'_2$ and the receiving electrode R2 is measured. The transmitter 31 provides a transmitting signal to the adjacent transmitting electrodes $T1B'_1$ and $T1B'_2$ through the signal line L1B'. The transmitter 31 provides the predetermined voltage level to the other transmitting electrodes $T1A'_1$~$T1A'_4$ which do not receive the transmitting signal from the transmitter 31 are connected to the fixed voltage level.

Assume the sensing array in FIG. 5 is applied in a differential measurement, the receiver 32 is implemented by is a differential receiver circuit with two input terminals. Assume that a crossing capacitance between two adjacent transmitting electrodes $T1A'_1$ and $T1A'_2$ and the receiving electrode R1' is measured. The transmitter 31 provides a transmitting signal to the adjacent transmitting electrodes $T1A'_1$ and $T1A'_2$ through the signal line L1A'. One input terminal of the receiver 32 is coupled to the receiving electrode R1', and the other terminal thereof is coupled to the receiving electrode R2' adjacent to the receiving electrode R1', as shown in Table 2. Moreover, the other transmitting electrodes $T1B'_1$~$T1B'_4$ which do not receive signals from the transmitter 31 are connected to the predetermined voltage level. Assume that a crossing capacitance between two adjacent transmitting electrodes $T1B'_1$ and $T1B'_2$ and the receiving electrode R2 is measured. The transmitter 31 provides a transmitting signal to the adjacent transmitting electrodes $T1B'_1$ and $T1B'_2$ through the signal line L1B'. One input terminal of the receiver 32 is coupled to the receiving electrode R2', and the other terminal thereof is coupled to the receiving electrode R1' or R3' adjacent to the specific receiving electrode R2', as shown in Table 2. Moreover, the other transmitting electrodes $T1A'_1$~$T1A'_4$ which do not receive signals from the transmitter 31 are connected to the predetermined voltage level. In some embodiments, the predetermined voltage level can be a voltage level of a ground or a voltage level with the polarity inverse to the polarity of the voltage level of the transmitting signal. In the case in which the predetermined voltage level is a voltage level with the polarity inverse to the polarity of the voltage level of the transmitting signal, according to the differential capacitance measurement, the output signal of the receiver 32 represents the sum of the two cross capacitance values related to the measured receiving electrodes due to the two signals with complementary polarities. Moreover, according to the differential capacitance measurement, when the sensing device 3 with the sensing array of FIG. 5 is integrated with a display device, the noise on the measured receiving electrode resulted from display electrodes of the display device or from other sources can be eliminated.

TABLE 2

| Measuring crossing capacitance between the two adjacent transmitting electrodes and the receiving electrode | Providing the transmitting signals with complementary polarities respectively to the transmitting electrodes | Connecting the receiving electrode to one input terminal of the receiver | Connecting the receiving electrode to the other input terminal of the receiver |
|---|---|---|---|
| $T1A'_1$ & $T1A'_2$, R1' | $T1A'_1$ & $T1A'_2$ | R1 | R2 |
| $T1B'_1$ & $T1B'_2$, R2' | $T1B'_1$ & $T1B'_2$ | R2 | R1 or R3 |
| $T1A'_3$ & $T1A'_4$, R3 | $T1A'_3$ & $T1A'_4$ | R3 | R2 or R4 |
| $T1B'_4$ & $T1B'_4$, R4 | $T1B'_4$ & $T1B'_4$ | R4 | R3 |

Figure 6:
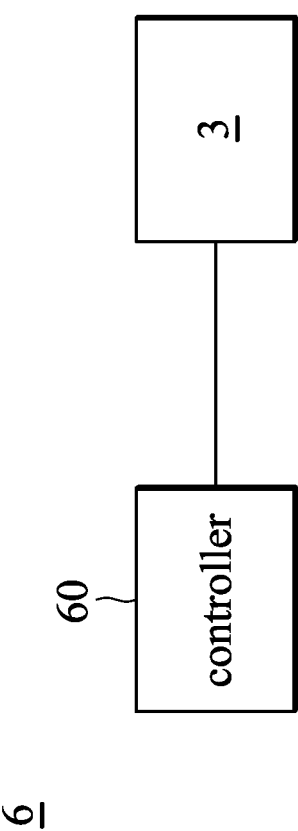
FIG. 6 shows an exemplary embodiment of a display device.

FIG. 6 schematically shows a display apparatus 6 employing the disclosed sensing device 3 with the sensing array of FIG. 4 or FIG. 5. Generally, the apparatus 6 includes a controller 60 and the sensing device 3 shown in FIG. 3, etc. The controller 60 is operatively coupled to the sensing device 3 and provides control signals to the sensing device 3.

Figure 7:
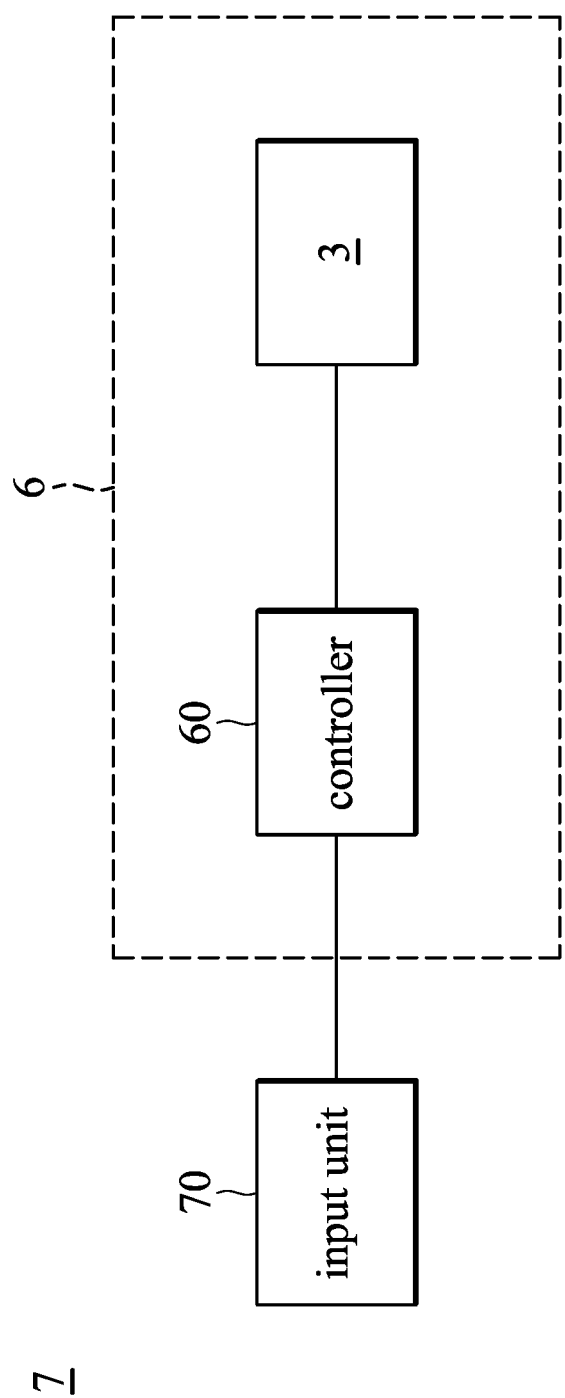
FIG. 7 shows an exemplary embodiment of an electronic device.

FIG. 7 schematically shows an electronic device 7 employing the disclosed display apparatus 6. The electronic device 7 may be a portable device such as a PDA, digital camera, notebook computer, tablet computer, cellular phone, a display monitor device, or similar. Generally, the electronic device 7 comprises an input unit 70 and the display apparatus 6 shown in FIG. 6, etc. Further, the input unit 70 is operatively coupled to the display apparatus 6 and provides input signals to the display apparatus 6. The controller 60 of the display apparatus 6 provides the control signals to the sensing device 3 according to the input signals.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sensing device comprising:
   at least one first receiving electrode extending in a first direction;

a plurality of first electrodes connected electrically by a first signal line, wherein a width of each first electrode is larger than a width of the first signal line, the first signal line passes through the plurality of first electrodes, the first signal line is partially overlapped with the plurality of first electrodes, and the plurality of first electrodes have a first voltage level; and at least one second electrode, wherein the at least one second electrode has a second voltage level, the plurality of first electrodes and the at least one second electrode are disposed on a same row which extends in a second direction intersecting the first direction, and the first voltage level is different from the second voltage level;

wherein the first signal line crosses the at least one first receiving electrode and the at least one second electrode.

2. The sensing device as claimed in claim 1, wherein the plurality of first electrodes are electrically controlled by a transmitter, and the transmitter provides a transmitting signal to the plurality of first electrodes, and the second voltage level is a predetermined voltage level.

3. The sensing device as claimed in claim 2, wherein a polarity of the predetermined voltage level is different from a polarity of a voltage level of the transmitting signal.

4. The sensing device as claimed in claim 1, wherein the second voltage level is a ground voltage level.

5. The sensing device as claimed in claim 4, wherein the plurality of first electrodes are arranged in turn along the second direction, the at least one second electrode comprises a plurality of second electrodes arranged in turn along the second direction, and an imaginary line parallel to the second direction passes through the plurality of first electrodes and the at least one second electrode.

6. The sensing device as claimed in claim 1, wherein the at least one second electrode is electrically connected to a second signal line, a width of the at least one second electrode is larger than a width of the second signal line.

7. The sensing device as claimed in claim 6, wherein the second signal line passes through the at least one second electrode and overlaps the at least one second electrode.

8. The sensing device as claimed in claim 7, wherein the second signal line crosses the at least one first receiving electrode and the plurality of first electrodes.

9. A sensing device comprising:
a plurality of first receiving electrodes extending in a first direction;
a plurality of first electrodes extending in a second direction intersecting the first direction, wherein the plurality of first electrodes have a first voltage level and are electrically connected by a first signal line, the first signal line passes through the plurality of first electrodes, the first signal line is partially overlapped with the plurality of first electrodes, and a width of each first electrode is larger than a width of the first signal line; and a plurality of second electrodes extending in the second direction, wherein the plurality of second electrodes have a second voltage level, and the first voltage level is different from the second voltage level;

wherein one of the plurality of first electrodes and one of the plurality of first receiving electrodes are respectively closest to one of the plurality of second electrodes, and the one of the plurality of second electrodes is disposed between the one of the plurality of first electrodes and the one of the plurality of first receiving electrodes in the second direction, and wherein the first signal line crosses the plurality of first receiving electrodes and the plurality of second electrodes.

10. The sensing device as claimed in claim 9, wherein the plurality of first electrodes are electrically controlled by a transmitter, and the transmitter provides a transmitting signal to the plurality of first electrodes, and the second voltage level is a predetermined voltage level.

11. The sensing device as claimed in claim 10, wherein a polarity of the predetermined voltage level is different from a polarity of a voltage level of the transmitting signal.

12. The sensing device as claimed in claim 9, wherein the second voltage level is a ground voltage level.

13. The sensing device as claimed in claim 12, wherein the plurality of first electrodes are arranged in turn along the second direction, the plurality of second electrodes arranged in turn along the second direction, and an imaginary line parallel to the second direction passes through the plurality of first electrodes and the plurality of second electrodes.

14. The sensing device as claimed in claim 13, wherein the second signal line passes through the plurality of second electrodes and overlaps the plurality of second electrodes.

15. The sensing device as claimed in claim 9, wherein the plurality of second electrodes are electrically connected to a second signal line, a width of each second electrode is larger than a width of the second signal line.

16. The sensing device as claimed in claim 15, wherein the second signal line crosses the plurality of first receiving electrodes and the plurality of first electrodes.

* * * * *